United States Patent
Hornquist Astrand et al.

(10) Patent No.: US 10,013,567 B2
(45) Date of Patent: Jul. 3, 2018

(54) PRIVATE AND PUBLIC SHARING OF ELECTRONIC ASSETS

(71) Applicant: Apple Inc., Cupertino, CA (US)

(72) Inventors: Per Love Hornquist Astrand, Emerald Hills, CA (US); Paul A. Seligman, San Francisco, CA (US); Van Hong, Santa Clara, CA (US); Mitchell D. Adler, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 92 days.

(21) Appl. No.: 14/866,782

(22) Filed: Sep. 25, 2015

(65) Prior Publication Data

US 2016/0217294 A1 Jul. 28, 2016

Related U.S. Application Data

(60) Provisional application No. 62/108,504, filed on Jan. 27, 2015.

(51) Int. Cl.
*G06F 21/62* (2013.01)
*H04L 9/14* (2006.01)
(Continued)

(52) U.S. Cl.
CPC ........ *G06F 21/6209* (2013.01); *H04L 9/0825* (2013.01); *H04L 9/0894* (2013.01);
(Continued)

(58) Field of Classification Search
CPC ...... G06F 21/60; G06F 21/62; G06F 21/6209; G06F 21/6218; G06F 21/6245;
(Continued)

(56) References Cited

U.S. PATENT DOCUMENTS

| | | | |
|---|---|---|---|
| 9,544,140 B1 * | 1/2017 | Bhatia | H04L 9/0891 |
| 2013/0254536 A1 * | 9/2013 | Glover | G06F 21/6209 |
| | | | 713/165 |
| 2015/0318986 A1 * | 11/2015 | Novak | H04L 63/0428 |
| | | | 713/189 |

OTHER PUBLICATIONS

Goh et al., SiRiUS: Securibg Remote Untrusted Storage, 2003, Internet Society—NDSS Symposium 2003, pp. 1-16.*

(Continued)

*Primary Examiner* — Jung Kim
*Assistant Examiner* — Adrian Stoica
(74) *Attorney, Agent, or Firm* — Dickinson Wright RLLP

(57) ABSTRACT

The embodiments set forth techniques for implementing a cloud service that enables cloud data to be shared between different users in a secure manner. One embodiment involves a sharing manager and a sharing client, where the sharing manager is configured to manage various data components stored within a storage system managed by the cloud service. These data components can include user accounts, share objects (for sharing data between users—and, in some cases, public users not known to the sharing manager)—as well as various "wrapping objects" that enable data to be logically separated in an organized manner within the storage system. According to this approach, the sharing client is configured to interface with the sharing manager in order to carry out various encryption/decryption techniques that enable the cloud data to be securely shared between the users.

20 Claims, 13 Drawing Sheets

(51) Int. Cl.
*H04L 29/06* (2006.01)
*H04L 9/08* (2006.01)

(52) U.S. Cl.
CPC ............... *H04L 9/14* (2013.01); *H04L 63/06* (2013.01); *H04L 63/10* (2013.01)

(58) Field of Classification Search
CPC ... G06F 21/6272; H04L 63/06; H04L 63/062; H04L 63/065; H04L 63/10; H04L 63/104; H04L 63/105; H04L 9/14; H04L 9/30; H04L 9/0819; H04L 9/0822; H04L 9/0825; H04L 9/0894
See application file for complete search history.

(56) References Cited

OTHER PUBLICATIONS

Kallahalla et al., Plutus: Scalable secure file sharing on untrusted storage, 2003, Fast vol. 3, pp. 29-42.*

* cited by examiner

PRIVATE AND PUBLIC SHARING OF ELECTRONIC ASSETS

CROSS-REFERENCE TO RELATED APPLICATIONS

The present application claims the benefit of U.S. Provisional Application No. 62/108,504, entitled "PRIVATE AND PUBLIC SHARING OF ELECTRONIC ASSETS", filed Jan. 27, 2015, the content of which is incorporated herein by reference in its entirety for all purposes.

FIELD

The described embodiments set forth a technique for enabling private and public sharing of electronic assets.

BACKGROUND

Recent years have shown a proliferation in the functionalities that are offered by cloud services, as well as the number of individuals who subscribe to these cloud services. To subscribe to a cloud service, an individual typically operates a primary computing device (e.g., a smartphone) that is configured with a user account known to the cloud service. The individual can also operate auxiliary computing devices that are configured with the same user account known to the cloud service, thereby enabling the user to achieve the benefit of useful functionality such as synchronization of the user's data across his or her computing devices. In most cases, a public key ($PK_{User}$) and a private key ($SK_{User}$) are generated in accordance with the information of which the user account is comprised, e.g., a username and a password, where $PK_{User}$ is used as a primary/root key for encrypting the user's data within the cloud service. In this manner, a possession of $SK_{User}$ enables the user's data to be decrypted, which means that special attention must be paid to the manner in which $SK_{User}$ is managed by the cloud service. This can also present challenges when attempting to enable different users of the cloud service to securely share data between one another.

SUMMARY

One embodiment sets forth a method for enabling a user to securely share an electronic asset. The method includes receiving, from the user, a first request to privately share the electronic asset with a guest, where (i) the user is associated with a public key ($PK_{User}$) and a private key ($SK_{User}$), and (ii) the guest is associated with a public key ($PK_{Guest}$) and a private key ($SK_{Guest}$). The method also includes, in response to the first request: (1) creating a share object that includes a first protected cloud storage object (PCSO), where the first PCSO is associated with a master key ($MK_{Invited}$), a public key ($PK_{Invited}$), and a private key ($SK_{Invited}$), (2) encrypting $SK_{Invited}$ using $MK_{Invited}$ to produce $\{SK_{Invited}\}MK_{Invited}$, and adding $\{SK_{Invited}\}MK_{Invited}$ to a first encrypted key store included in the first PCSO, (3) encrypting $MK_{Invited}$ using $PK_{Guest}$ to produce $\{MK_{Invited}\}PK_{Guest}$, and adding ($PK_{Guest}$, $\{MK_{Invited}\}PK_{Guest}$) to a first share list included in the first PCSO, (4) identifying a second PCSO that corresponds to the electronic asset, where the second PCSO is associated with a master key ($MK_{Asset}$), a public key ($PK_{Asset}$), and a private key ($SK_{Asset}$), and (5) encrypting $MK_{Asset}$ using $PK_{Invited}$ to produce $\{MK_{Asset}\}PK_{Invited}$, and adding ($PK_{Invited}$, $\{MK_{Asset}\}PK_{Invited}$) to a second share list included in the second PCSO. In this manner, when the guest provides $SK_{Guest}$, the guest is permitted to access the electronic asset.

The method also includes receiving, from the user, a second request to publicly share the electronic asset, and, in response to the second request, (1) creating, within the share object, a third PCSO, where the third PCSO is associated with a master key ($MK_{Self-Added}$), a public key ($PK_{Self-Added}$), and a private key ($SK_{Self-Added}$), where $SK_{Self-Added}$ is equal to $\{SK_{Asset}\}MK_{Asset}$, (2) encrypting $SK_{Self-Added}$ using $MK_{Self-Added}$ to produce $\{SK_{Self-Added}\}MK_{Self-Added}$, and adding $\{SK_{Self-Added}\}MK_{Self-Added}$ to a second encrypted key store included in the third PCSO, (3) encrypting $MK_{Self-Added}$ using $PK_{Self-added}$ to produce $\{MK_{Self-Added}\}PK_{Self-Added}$, and adding ($PK_{Self-Added}$, $\{MK_{Self-Added}\}PK_{Self-Added}$) to a third share list included in the third PCSO, and (4) encrypting $MK_{Invited}$ using $PK_{Self-added}$ to produce $\{MK_{Invented}\}PK_{Self-Added}$, and adding ($PK_{Self-Added}$, $\{MK_{Invented}\}PK_{Self-Added}$) to the first share list included in the first PCSO. In this manner, when a public user provides $SK_{Self-Added}$ (e.g., via a uniform resource locator that includes $SK_{Self-Added}$), the public user is permitted to access the electronic asset.

Other embodiments include a non-transitory computer readable medium configured to store instructions that, when executed by a processor, cause the processor to implement any of the foregoing steps.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
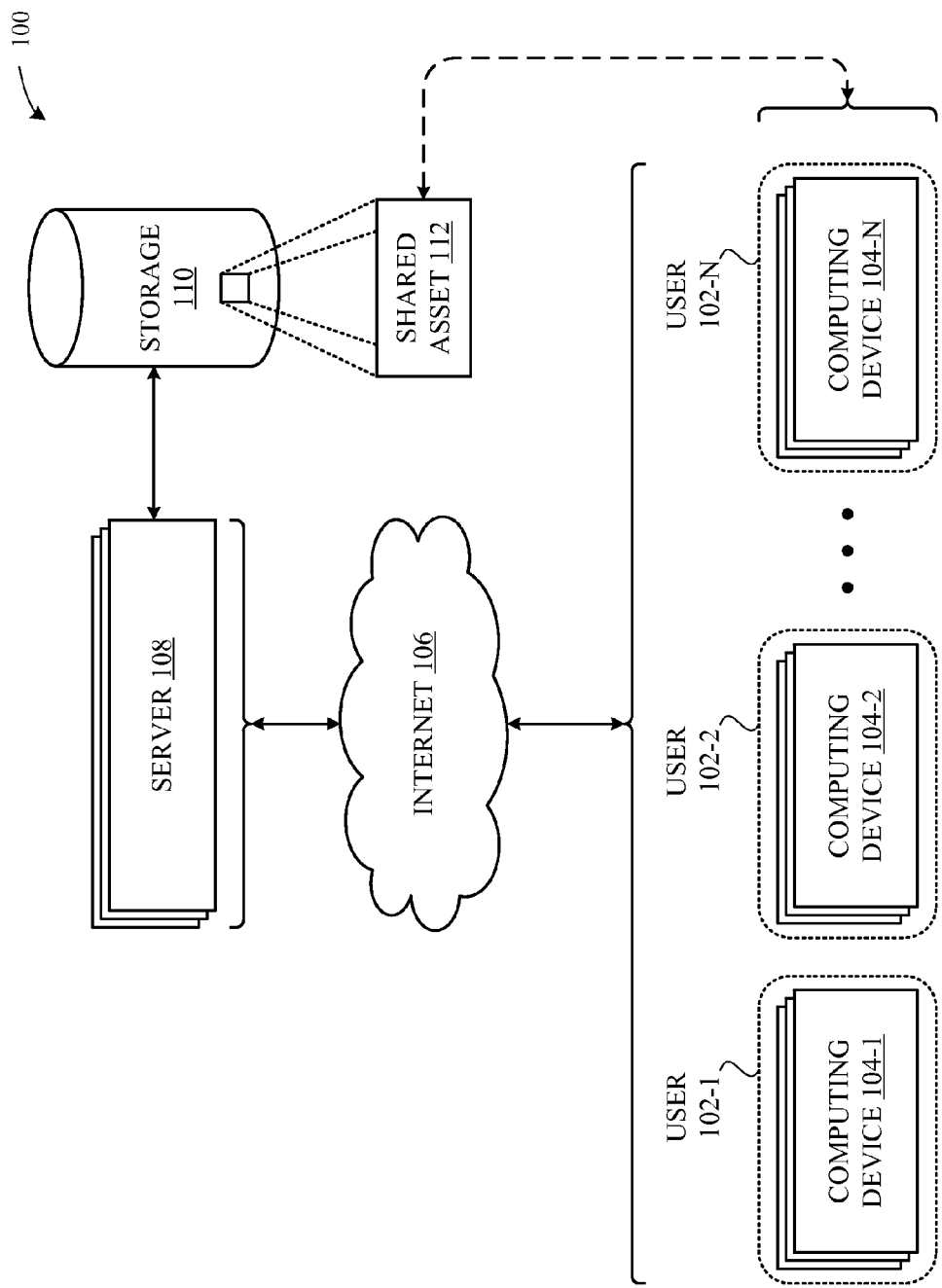
FIG. 1 illustrates a block diagram of different components of a system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Different approaches can be used to protect user data within a cloud service. For example, a first approach involves encrypting each user's $SK_{User}$ with a key ($K_{CloudService}$) that is managed by the cloud service, and storing the encrypted $SK_{User}$ (i.e., $\{SK_{User}\}K_{CloudService}$) within the cloud service. However, this approach has considerable drawbacks, as anyone who gains or demands access to $K_{CloudService}$ can potentially decrypt all user data managed by the cloud service. A second approach involves encrypting each user's $SK_{User}$ with a key ($K_{Username+Password}$) that is derived from the username and password associated with the user, and storing the encrypted $SK_{User}$ (i.e., $\{SK_{User}\}K_{Username+Password}$) within the cloud service. However, this approach also has considerable drawbacks, as anyone who possesses the username and password can gain access to $SK_{User}$ (and the user's data).

In an attempt to reduce the vulnerabilities of the aforementioned first and second approaches, a third, more recent approach being utilized involves encrypting a user's $SK_{User}$ with a special key—e.g., a key ($K_{Fingerprint}$) that is based on a fingerprint scan provided by the user—and storing the encrypted $SK_{User}$ (i.e., $\{SK_{User}\}K_{Fingerprint}$) on each of the user's computing devices (as opposed to within the cloud service). In this manner, the user's computing devices can decrypt and present $SK_{User}$ to the cloud service on an as-needed (i.e., session) basis, which minimizes the overall exposure that an adverse party can otherwise exploit when the first and second approaches are implemented. This third approach can present challenges, however, when a user seeks to privately or publicly share his or her data with other users.

Consider, for example, a user who desires to share an electronic document with another user. As set forth above, the user's electronic document is stored in an encrypted form within the cloud service, e.g., {electronic document}$SK_{User}$. Accordingly, for other users to gain access to the electronic document, the cloud service must implement a technique that enables the other users to decrypt the electronic document. However, because the third approach involves securely storing $SK_{User}$ on the computing devices of the user—and not within the cloud service itself—a challenge is presented when attempting to enable the cloud service to decrypt and provide the electronic document to the other users without possessing $SK_{User}$ in an unencrypted form.

The embodiments described herein set forth techniques for implementing a cloud service configured to enable cloud data to be shared between different users in a controlled, secure manner. Specifically, the embodiments described herein involve a sharing manager that is configured to manage various data components stored within a storage system managed by the cloud service, which can include user accounts, share objects (for sharing data between users—and, in some cases, public users not known to the sharing manager)—as well as various "wrapping objects" that enable data to be logically separated in an organized manner within the storage system. The embodiments described herein also involve a sharing client that is configured to interface with the sharing manager in order to carry out various encryption/decryption techniques. Specifically, the sharing client can be configured to implement protected cloud storage objects (PCSO), which, as described in greater detail herein, serve to lock the different wrapping objects in accordance with the manner in which data is shared between the different users within the cloud service. According to one embodiment, each PCSO is associated with a master key ($MK_{PCSO}$), a public key ($PK_{PCSO}$), and a private key ($SK_{PCSO}$). Notably, these keys are not stored in an unencrypted form within the PCSO, but are instead stored in an encrypted form within the PCSO or in other PCSOs that are logically linked to the PCSO (via the different wrapping objects), which contributes to the enhanced security benefits that are achieved when implementing the techniques described herein.

The embodiments described herein also set forth techniques for providing Uniform Resource Locators (URLs) that conveniently enable the different users to share data between one another within the cloud service. Specifically, the URL includes information that (i) identifies the cloud service (e.g., a domain name associated with the cloud service), (ii) locates a particular data element within the storage system managed by the cloud service, and (iii) enables the data element to be unlocked and presented in a decrypted form. As described in greater detail herein, different portions of the URL information can be obfuscated (e.g., the location of the particular data element) to help privatize the manner in which the cloud service and the storage system are organized. The URL can be presented in a "long" format, or a more portable, user-friendly "short" format, where both formats do not compromise the enhanced security benefits that are achieved when implementing the techniques described herein.

FIG. 1 illustrates a block diagram of different components of a system 100 that is configured to implement the various techniques described herein, according to some embodiments. More specifically, FIG. 1 illustrates a high-level overview of the system 100, which, as shown, includes multiple computing devices 104, multiple servers 108, and a storage 110. The computing devices 104 can represent, for example, desktop computing devices, laptop computing devices, mobile computing devices, and the like. The servers 108 can represent, for example, computing devices that are configured to provide "cloud" services (e.g., electronic document storage, messaging, etc.) to the computing devices 104 in conjunction with the storage 110 and internet connectivity 106. The storage 110 can represent any storage system that is configured to store electronic data, e.g., a collection of hard disk drives (HDDs) and/or solid state drives (SSDs). The internet connectivity 106 can represent wired/wireless communication systems that enable the computing devices 104 and the servers 108 to electronically communicate with one another.

According the illustration of FIG. 1, particular groups of the computing devices 104 can be associated with a particular individual 102, e.g., each individual 102 can configure each of his or her computing devices 104 with a same user account (e.g., an email address and a password) that is known to the cloud services provided by the servers 108. Configuring the computing devices 104 with the same user account enables the individual 102 to consume helpful services such as synchronization of data across the computing devices, data recovery, and the like. As described in greater detail below, the servers 108 and the computing devices 104 can also be configured to enable individuals 102 to privately/publicly share their electronic documents (e.g., word processing documents, spreadsheets, presentations, photographs, videos, etc.), an example of which is illustrated in FIG. 1 as a shared asset 112 that is stored in the storage 110 and managed by the servers 108. Importantly, and as previously mentioned herein, these techniques involve encrypting data within the storage 110 in a manner that enables designated computing devices 104 to decrypt and access the data (when appropriate), while preventing outsiders—such as server 108/storage 110 administrators—from freely decrypting and accessing the data.

Figure 2:
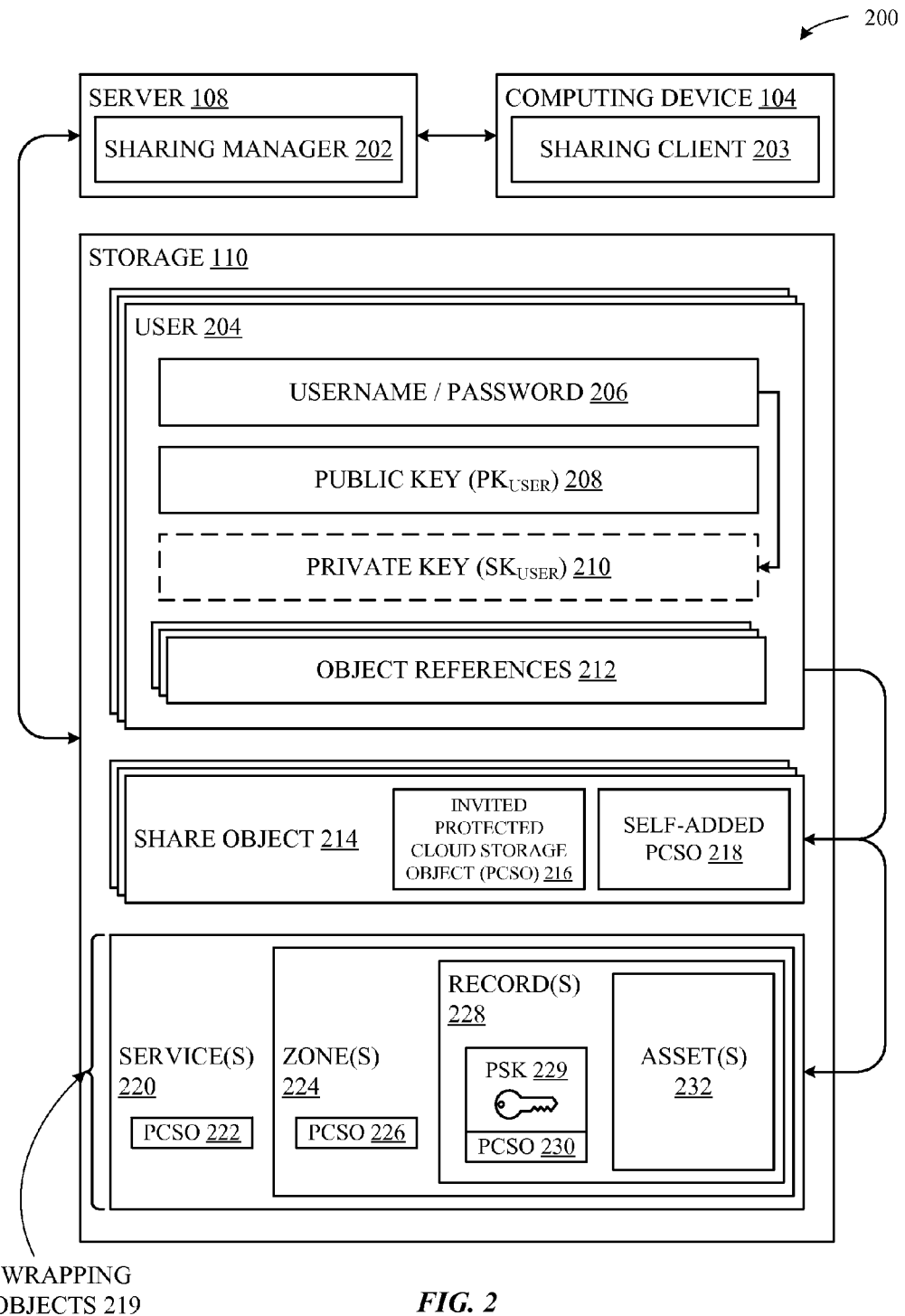
FIG. 2 illustrates a block diagram of a more detailed view of particular components of the server and the storage device illustrated in FIG. 1, according to one embodiment.

FIG. 2 illustrates a block diagram of a more detailed view 200 of particular components of the server 108 and the storage 110, according to one embodiment. As shown in FIG. 2, the server 108 can be configured to implement a sharing manager 202, which, as described in greater detail below, is a software component configured to manage various data components that are stored within the storage 110, which, as shown in FIG. 2, can include users 204, share objects 214 (for sharing data between users 204—and, in some cases, public users not known to the sharing manager 202)—and various wrapping objects 219 that enable data to be logically separated in an organized manner within the storage 110. Similarly, each computing device 104 can implement a sharing client 203, which, as described in greater detail herein, is configured to interface with the sharing manager 202 in order to carry out various encryption/decryption techniques.

As shown in FIG. 2, a user 204 (i.e., a user account) can include a username/password 206, a public key ($PK_{User}$) 208, a private key ($SK_{User}$) 210, and various object references 212 that refer to share objects 214 and wrapping objects 219. The public key $PK_{User}$ 208 and private key $SK_{User}$ 210 can be used as a root key for performing various cryptographic functions—in conjunction with the wrapping objects 219—on data that is associated with the user 204 and stored in the storage 110. According to one embodiment, the public key $PK_{User}$ 208 is stored in an unencrypted form (i.e., plaintext) within the storage 110 and can be used to encrypt data that is associated with the user 204, such that the private key $SK_{User}$ 210 serves as a means for decrypting data that is encrypted using the public key $PK_{User}$ 208. In order to enhance security, the private key $SK_{User}$ 210 is not stored in an unencrypted form within the storage 110, as this would enable anyone with access to the storage 110 to simply retrieve the private key $SK_{User}$ 210 and decrypt the data associated with the user 204. Instead, the sharing client 203 can be configured to derive the private key $SK_{User}$ 210 from the username/password 206. For example, the private key $SK_{User}$ 210 can be stored on the storage 110 in an encrypted form, where the private key $SK_{User}$ 210 is encrypted using a particular key that is derived from the username/password 206 when the username/password 206 is provided by the user 204. Alternatively, the private key $SK_{User}$ 210 is not stored at all within the storage 110, and instead is stored in a secure manner within one or more of the computing devices 104 associated with the user 204. With this alternative approach, the private key $SK_{User}$ 210 can be provided on a per-session basis to the sharing manager 202 when the user 204 wishes to access his or her data, where the sharing manager 202 is configured to temporarily cache the private key $SK_{User}$ 210 until the session is closed.

As mentioned above, the data components within the storage 110 can also include share objects 214, which, as described in greater detail herein, are data objects that enable a user 204 to privately share a particular asset (e.g., an electronic document) with another user 204—or, in some cases, to publicly share the particular asset via a sharing URL that can be used to access to the particular asset. To accomplish the foregoing sharing techniques, each share object 214 is configured to include two protected cloud storage objects (PCSOs). A first one of the PCSOs—illustrated in FIG. 2 as an invited PCSO 216—is configured to facilitate private sharing of the particular asset with specific users 204 known to the sharing manager 202. A second one of the two PCSOs—illustrated in FIG. 2 as a self-added PCSO 218—is configured to facilitate public sharing of the particular asset—via the sharing URL—with users who are not known to the sharing manager 202, or to users 204 who are known to the sharing manager 202 but do not wish to provide their username/password 206 when accessing the particular data asset. This can occur, for example, when a user 204 attempts to access the particular asset via the sharing URL on a temporary computer, and chooses to access the particular asset as a guest instead of providing his or her username/password 206 to the sharing manager 202. A detailed breakdown of a PCSO is provided below in conjunction with FIG. 3.

As mentioned above, the various wrapping objects 219 enable data to be logically separated in an organized manner within the storage 110. Specifically, and as shown in FIG. 2, a service wrapping object 220 functions as a topmost wrapping object 219, and can be used to logically separate data of a user 204 based on different services that correspond to the data. For example, a first service wrapping object 220 can be used to logically separate all messaging data (e.g., text, email, chat, etc.) associated with the user 204, a second service wrapping object 220 can be used to logically separate all media data (e.g., audio, photo, video, etc.) associated with the user 204, and a third service wrapping object 220 can be used to logically separate all electronic document data (e.g., documents, spreadsheets, presentations) associated with the user 204. As also shown in FIG. 2, and as described in greater detail below in conjunction with FIG. 3, each service wrapping object 220 has a corresponding PCSO 222 that includes cryptographic information for encrypting/decrypting the data belonging to the service wrapping object 220. Although not illustrated in FIG. 2, it is noted that the private key $SK_{User}$ 210 associated with the user 204 can, according to one embodiment, be used to unlock (i.e., decrypt) the cryptographic information included in the PCSO 222. In turn, this cryptographic information can be used to (i) decrypt the data belonging to the service wrapping object 220, and (ii) unlock the cryptographic information included in the PCSOs of wrapping objects 219 that are logically nested within the service wrapping object 220. It is also noted that, in some cases, the private key $SK_{User}$ 210 is not designed to directly unlock the PCSO 222, but can instead be used to unlock a set of keys for unlocking the PCSOs 222 of different service wrapping objects 220, thereby enhancing overall security.

As mentioned above, the PCSO 222 of a service wrapping object 220 can be used to unlock the cryptographic information included in the PCSOs of wrapping objects 219 that are logically nested within the service wrapping object 220. As shown in FIG. 2, a zone wrapping object 224 is the next wrapping object 219 that is nested in the service wrapping object 220, and can be used to further separate the data belonging to the service wrapping object 220. For example, if the service wrapping object 220 logically separates all media data associated with the user 204, then a different zone wrapping object 224 can be logically established within the service wrapping object 220 for each type of media data (e.g., audio, photo, video, etc.) belonging to the user 204. As also shown in FIG. 2, each zone wrapping object 224 includes a PCSO 226 that can be used to (i) decrypt the data belonging to the zone wrapping object 224, and (ii) unlock the cryptographic information included in the PCSOs of the wrapping objects 219 that are logically nested within the zone wrapping object 224.

The next wrapping object 219 that is logically nested within a zone wrapping object 224 is a record wrapping object 228, where the record wrapping object 228 can be used to further separate the data belonging to the zone wrapping object 224. For example, if the zone wrapping object 224 corresponds to audio media data, then a different record wrapping object 228 can be logically established within the zone wrapping object 224 for each audio file (e.g. "file_1", "file_2", etc.) belonging to the user 204. As also shown in FIG. 2, each record wrapping object 228 includes a PCSO 230 that can be used to (i) decrypt the data belonging to the record wrapping object 228, and (ii) unlock the cryptographic information included in the PCSOs of wrapping objects 219—specifically, the asset wrapping objects 232—that are logically nested within the record wrapping object 228. As also shown in FIG. 2, the record wrapping object 228 is associated with a "public sharing key" (PSK) 229, which, as described in greater below, can be used to implement the various sharing techniques set forth herein. According to one embodiment, the PSK 229 is a key that is generated in accordance with the record wrapping object 228, and the PSK 229 is stored in an encrypted form. For example, the PSK 229 can be encrypted using a private key that is associated with the PCSO 230 (i.e. $SK_{PCSO}$), such that possession of $SK_{PCSO}$ is required to obtain the PSK 229 in an unencrypted form (e.g. when generating a URL to share the record wrapping object 228/asset wrapping object 232, where the URL includes the PSK 229).

Each asset wrapping object 232 can be used to further separate the data belonging to the record wrapping object 228. For example, if the record wrapping object 228 corresponds to an audio file named "file_1", then a different asset wrapping object 232 can be logically established within the record wrapping object 228 for different data elements that are associated with the audio file (e.g. the binary data of which the audio file is comprised, metadata associated with the audio file, etc.). According to one embodiment, the asset wrapping object 232 includes information (e.g. metadata) that identifies a data component (e.g. an electronic document) stored within the storage 110, where the data component is encrypted using a key ($K_{DataComponent}$). The key $K_{DataComponent}$ is stored in an encrypted form within the record wrapping object 228 in which the asset 232 is logically nested. Specifically, $K_{DataComponent}$ is encrypted using the private key of the PCSO 230 ($SK_{PCSO}$) (i.e. $\{K_{DataComponent}\}SK_{PCSO}$). In this manner, anyone with access to the private key of the PCSO 230 ($SK_{PCSO}$) is able to obtain $K_{DataComponent}$ in an unencrypted form, whereupon $K_{DataComponent}$ can be used to decrypt the data component.

It is noted that the wrapping objects 219 are not limited to those illustrated in FIG. 2 and described herein, but that any number of wrapping objects 219 can be implemented in a similar manner to accomplish a level of granularity that coincides with the desired level of logical separation of the data managed within the storage 110.

Figure 3:
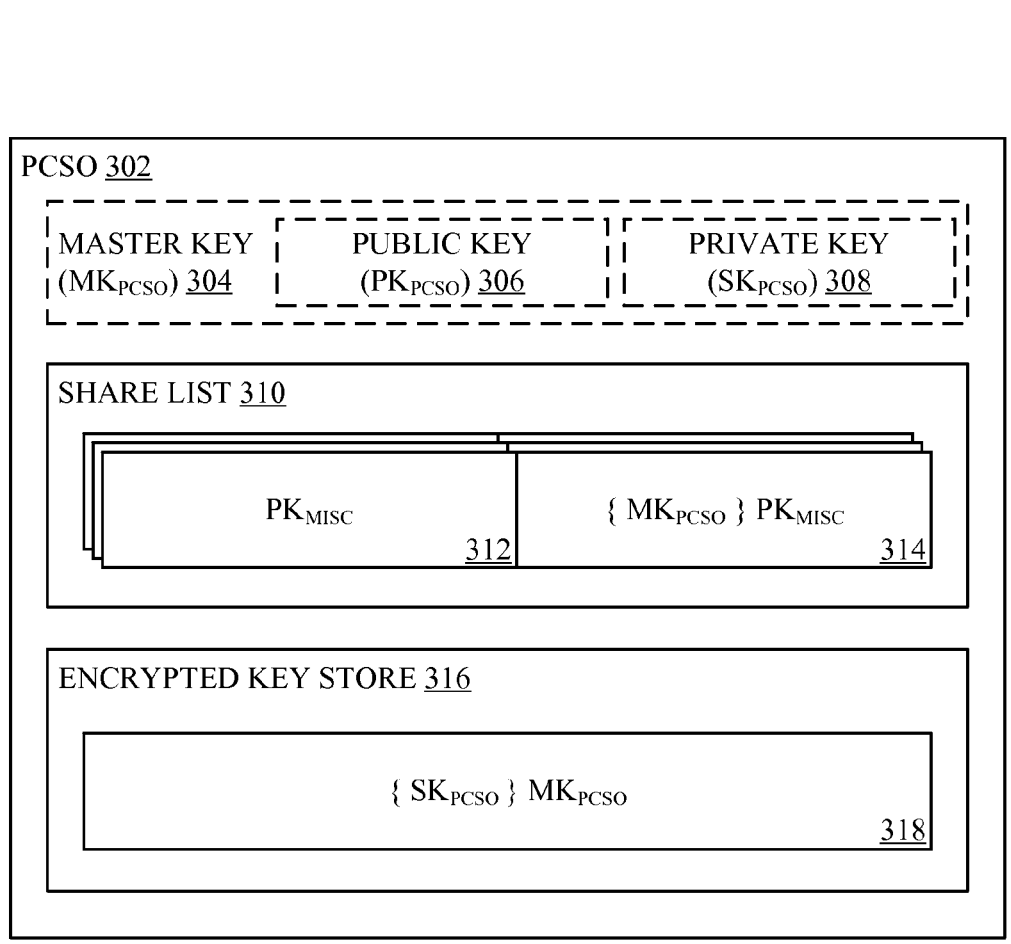
FIG. 3 illustrates a block diagram of a detailed view of a generic protected cloud storage object (PCSO), according to one embodiment.

FIG. 3 illustrates a block diagram of a detailed view 300 of a generic protected cloud storage object (PCSO) 302, according to one embodiment. As shown in FIG. 3, the PCSO 302 is associated with a master key ($MK_{PCSO}$) 304, a public key ($PK_{PCSO}$) 306, and a private key ($SK_{PCSO}$) 308. As previously noted herein, and according to some embodiments, these keys are not stored in an unencrypted form within the PCSO 302, but are instead stored in an encrypted form within the PCSO 302 or in other PCSOs that are logically linked to the PCSO 302. Storage of the keys in this manner can be accomplished through using a share list 310 and an encrypted key store 316, which are described below in greater detail in conjunction with FIG. 3.

The share list 310 contributes to implementing the various sharing techniques set forth herein. Specifically, the share list 310 is configured to manage mappings between (i) a public key, and (ii) the master key $MK_{PCSO}$ 304 in an encrypted form using the public key. This notion is illustrated in FIG. 3 by a generic example mapping that includes an entry 312 (i.e. $PK_{MISC}$) that is mapped to an entry 314 (i.e. $\{MK_{PCSO}\ 304\}PK_{MISC}$). To provide a more specific example, consider when a holder of a public key—for example, a public key $PK_{User}$ 208 of a user 204—encrypts the master key ($MK_{PCSO}$) 304 to produce $\{MK_{PCSO}\ 304\}PK_{User}$ 208. Continuing with this example, a mapping is created within the share list 310 between $PK_{User}$ 208 (i.e. a new entry 312) and $\{MK_{PCSO}\ 304\}PK_{User}$ 208 (i.e. a corresponding new entry 314). In this manner, when a holder of the private key $SK_{User}$ 210 (that corresponds to the public key $PK_{User}$ 208) seeks to obtain the master key $MK_{PCSO}$ 304 in an unencrypted form, the appropriate entry 312 within the share list 310 can be identified by performing a lookup against the public key $PK_{User}$ 208. In turn, the value held within the entry 314 that corresponds to the looked-up entry 312 can be decrypted using the private key $SK_{User}$ 210 to produce the master key $MK_{PCSO}$ 304 in an unencrypted form. It is noted that the share list 310 can scale to hold any number of entries in accordance with the number of entities (e.g. users 204) that become authorized to unlock the master key $MK_{PCSO}$ 304. As described in greater detail below, the master key $MK_{PCSO}$ 304, in conjunction with the encrypted key store 316, enables the private key $SK_{PCSO}$ 308 to be obtained in an unencrypted form, where the private key $SK_{PCSO}$ 308 can be used to carry out a variety of functions.

As noted above, the PCSO 302 includes an encrypted key store 316, which, according to one embodiment, includes an entry whose value corresponds to the private key $SK_{PCSO}$ 308 encrypted by the master key $MK_{PCSO}$ 304 (i.e. $\{SK_{PCSO}\}MK_{PCSO}$318). Given that $SK_{PCSO}$ 308 is encrypted by $MK_{PCSO}$ 304, possession of the master key $MK_{PCSO}$ 304 enables the private key $SK_{PCSO}$ 308 to be unlocked. In turn, the private key $SK_{PCSO}$ 308 can be used to decrypt data associated with the wrapping object 219 that corresponds to the PCSO 302. Moreover, the private key $SK_{PCSO}$ 308 can be used to unlock the master key for PCSOs that correspond to other wrapping objects 219 that are logically nested within the wrapping object 219. Consider, for example, a zone wrapping object 224 and a record wrapping object 228, where the record wrapping object 228 is logically nested within the zone wrapping object 224. According to this example, a private key ($SK_{Zone}$) that corresponds to the zone wrapping object 224—specifically, to the PCSO 226 associated with the zone wrapping object 224—can be used to derive a corresponding public key ($PK_{Zone}$). In turn, the record wrapping object 228—specifically, the share list 310 included in the PCSO 230 associated with the record wrapping object 228—can be searched to identify a mapping between $PK_{Zone}$ and $\{MK_{Record}\}PK_{Zone}$. Once $\{MK_{Record}\}PK_{Zone}$ is obtained, the private key $SK_{Zone}$ can be used to establish $MK_{Record}$ in an unencrypted form—which, as described herein, enables data associated with the record wrapping object 228 to be decrypted—or, further, for the nested decryption cycle to continue down to wrapping objects 219 that are logically nested within the record wrapping object 228 (e.g. asset wrapping objects 232).

Figure 4A:
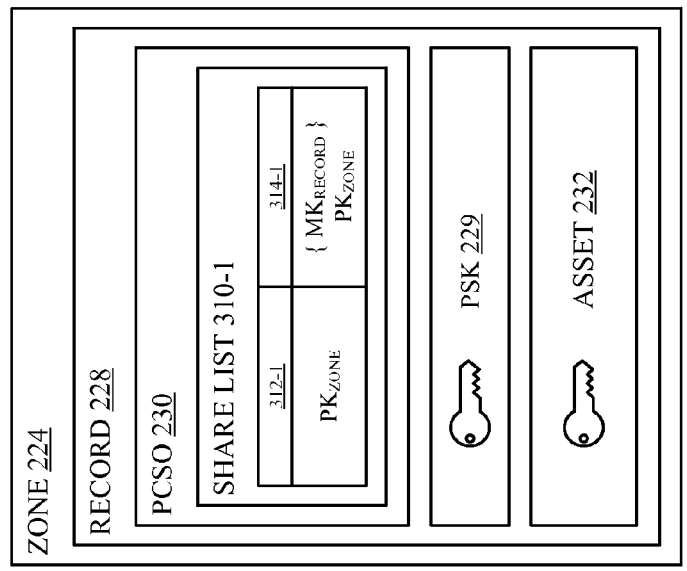
FIGS. 4A-4E illustrate various block diagrams that represent an example sequence of events that occur as a particular record is shared by a user, according to some embodiments.

FIGS. 4A-4E illustrate various block diagrams that represent an example sequence of events that occur as a particular record wrapping object 228 is shared by a user 204, according to some embodiments. Specifically, FIG. 4A illustrates a block diagram 400 that represents a first step of the example sequence, where the record wrapping object 228 is nested within a zone wrapping object 224. As shown in FIG. 4A, the record wrapping object 228 is associated with a PCSO 230, a PSK 229, and an asset wrapping object 232 that is logically nested within the record wrapping object 228. As shown in FIG. 4A, the PCSO 230 includes a share list 310-1 that includes the entries 312-1 and 312-2, which establish a mapping between $PK_{Zone}$ and $\{MK_{Record}\}PK_{Zone}$.

Figure 4B:
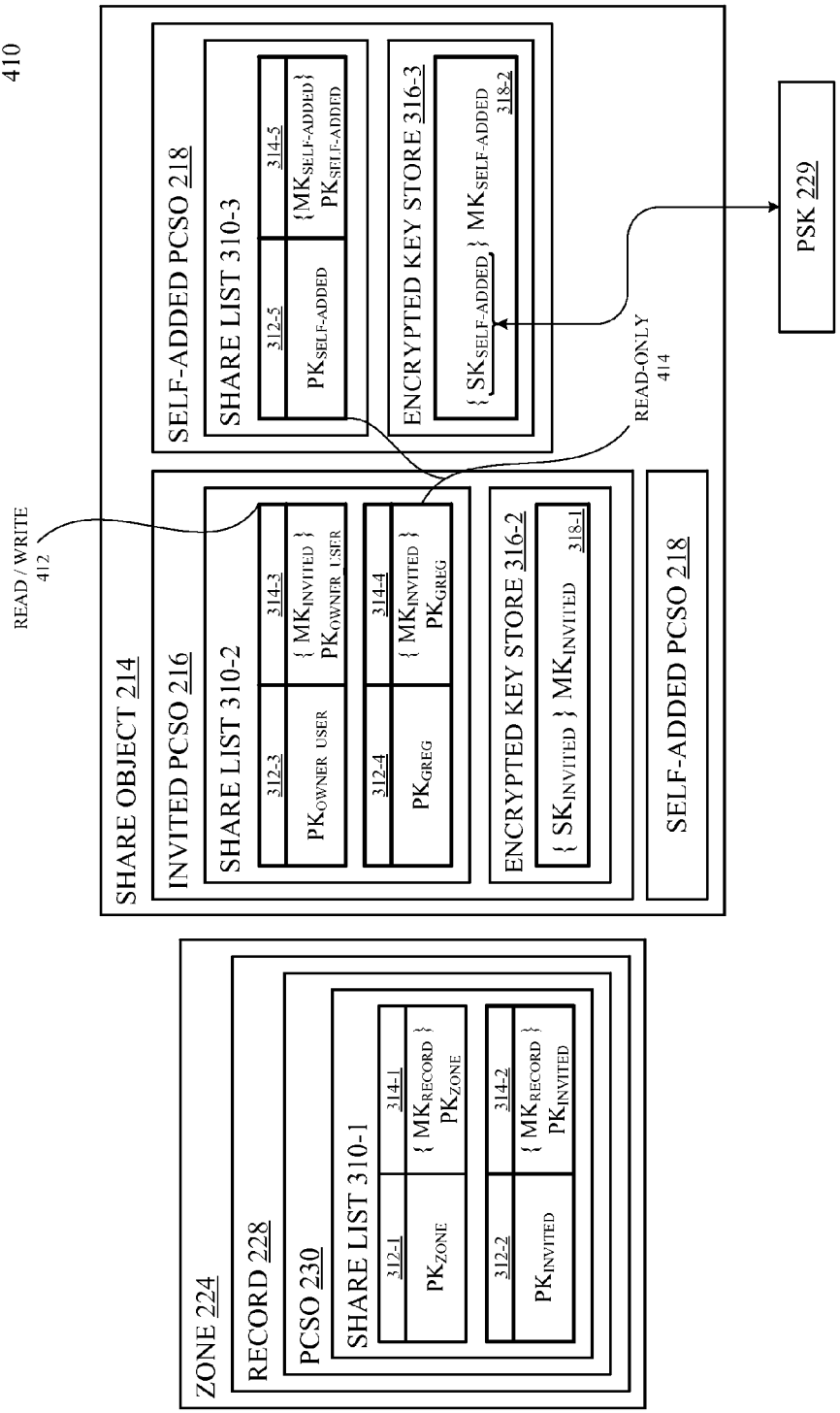

FIG. 4B illustrates a block diagram 410 that represents a second step of the example sequence, where the sharing client 203 receives a request from the user 204 (named "OWNER_USER") to privately share the record wrapping object 228 with a non-admin user 204 (named "GREG"). In response to the request, the sharing client 203 establishes a sharing object 214 that includes an invited PCSO 216 and a self-added PCSO 218. Specifically, establishing the invited PCSO 216 involves generating a master key $MK_{Invited}$, public key $PK_{Invited}$, and a private key $SK_{Invited}$, and establishing the self-added PCSO 218 involves generating a master key $MK_{Self-Added}$, a public key $PK_{Self-Added}$, and a private key $SK_{Self-Added}$. As previously set forth herein, these keys are not stored in plaintext within their respective PCSOs, but instead are stored in an encrypted form such that a particular decryption chain is required to unlock them.

As shown in FIG. 4B, the invited PCSO 216 includes a share list 310-2 and an encrypted key store 316-2, whereas the self-added PCSO 218 includes a share list 310-3 and an encrypted key store 316-3. In accordance with the request, the sharing client 203 creates two new mapping entries within the share list 310-2 of the invited PCSO 216. Specifically, the entries 312-3 and 314-3 are readable/writable (by OWNER_USER, as indicated by read/write 412), and enable OWNER_USER to use his or her private key $SK_{Owner\_User}$ to obtain the master key $MK_{Invited}$. Similarly, the entries 312-4 and 314-4 enable GREG to use his or her private key $SK_{Greg}$ to obtain the master key $MK_{Invited}$. However, because the request indicates that GREG is a non-admin user, the sharing client 203 designates the entries 312-4 and 314-4 as read-only (by GREG, as indicated by read-only 414), which prevents GREG from modifying the share list 310-2 in an unauthorized manner. In addition, the sharing client 203 is configured (i) to add the entry 318-1: $\{SK_{Invited}\}MK_{Invited}$ to the encrypted key store 316-2 of the invited PCSO 216, and (ii) add the entries 312-2 and 314-2 within the share list 310-1 of the PCSO 230. In this manner, anyone who can obtain $MK_{Invited}$—such as GREG, via the share list 310-2 using $PK_{Greg}$ (to locate the entry 312-4) and $SK_{Greg}$ (to decrypt the entry 314-4)—can also obtain the master key $MK_{Record}$.

As also shown in FIG. 4B, the sharing client 203 is configured to create a new mapping entry within the share list 310-3 of the self-added PCSO 218. Specifically, the entries 312-5 and 314-5 enable a self-added user—such as a user who attempts to access the record wrapping object 228 using a URL that links to the record wrapping object 228—to obtain the master key $MK_{Invited}$. It is noted, however, that public sharing of the record wrapping object 228 has not been activated, and that the actions taken by the sharing client 203 are merely initialization steps so that a transition from private sharing to public sharing can quickly be carried out if OWNER_USER chooses to make the record wrapping object 228 publicly-accessible (via the URL). In addition, the initialization steps taken by the sharing client 203 include adding the entry 318-2: $\{SK_{Self-Added}\}MK_{Self-Added}$ to the encrypted key store 316-3 of the self-added PCSO 218, where $SK_{Self-Added}$ is equal to the PSK 229. Accordingly, as there is not yet an entry in the share list 310-2 that maps $PK_{Self-Added}$ to $\{MK_{Invited}\}PK_{Self-Added}$, a user who attempts to obtain $SK_{Record}$—which is ultimately required to access the contents of the record wrapping object 228—will hit a dead-end when after he or she obtains $SK_{Self-Added}$.

Figure 4C:
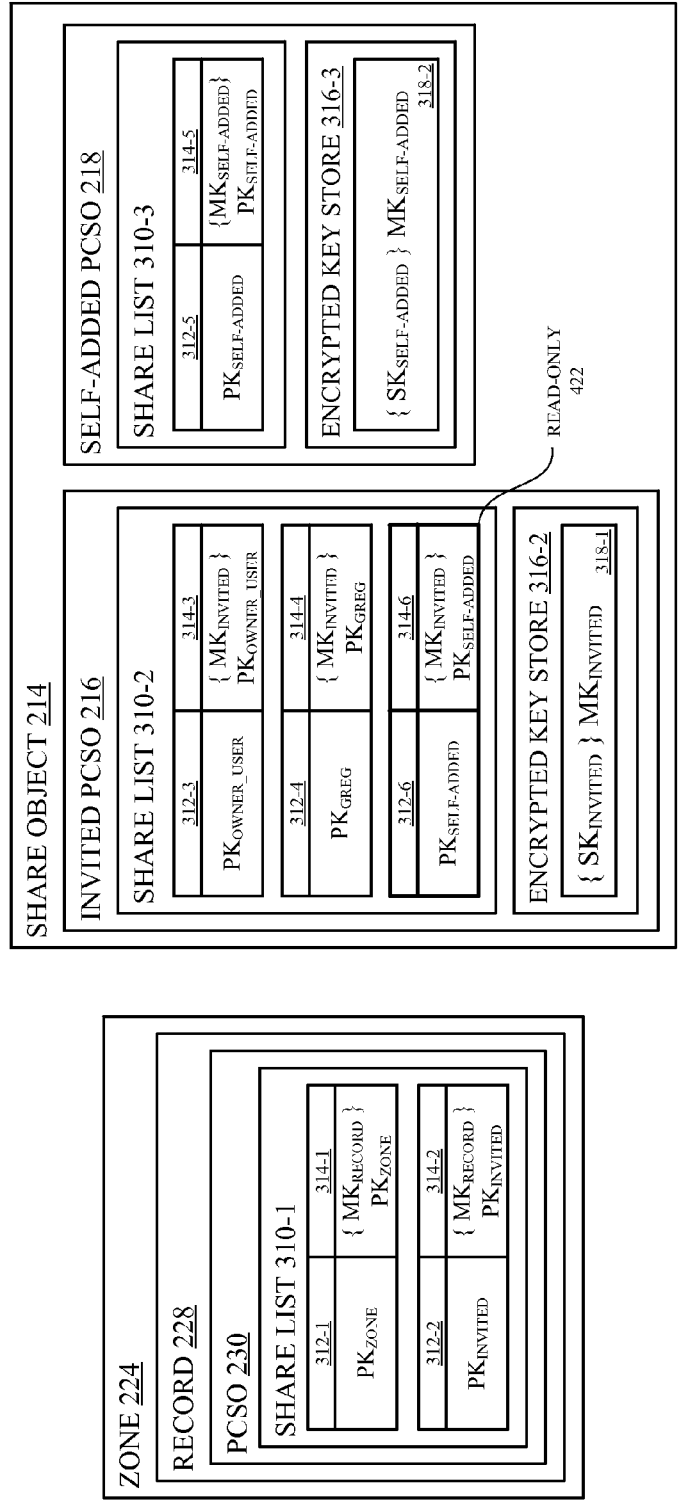
Figure 4D:
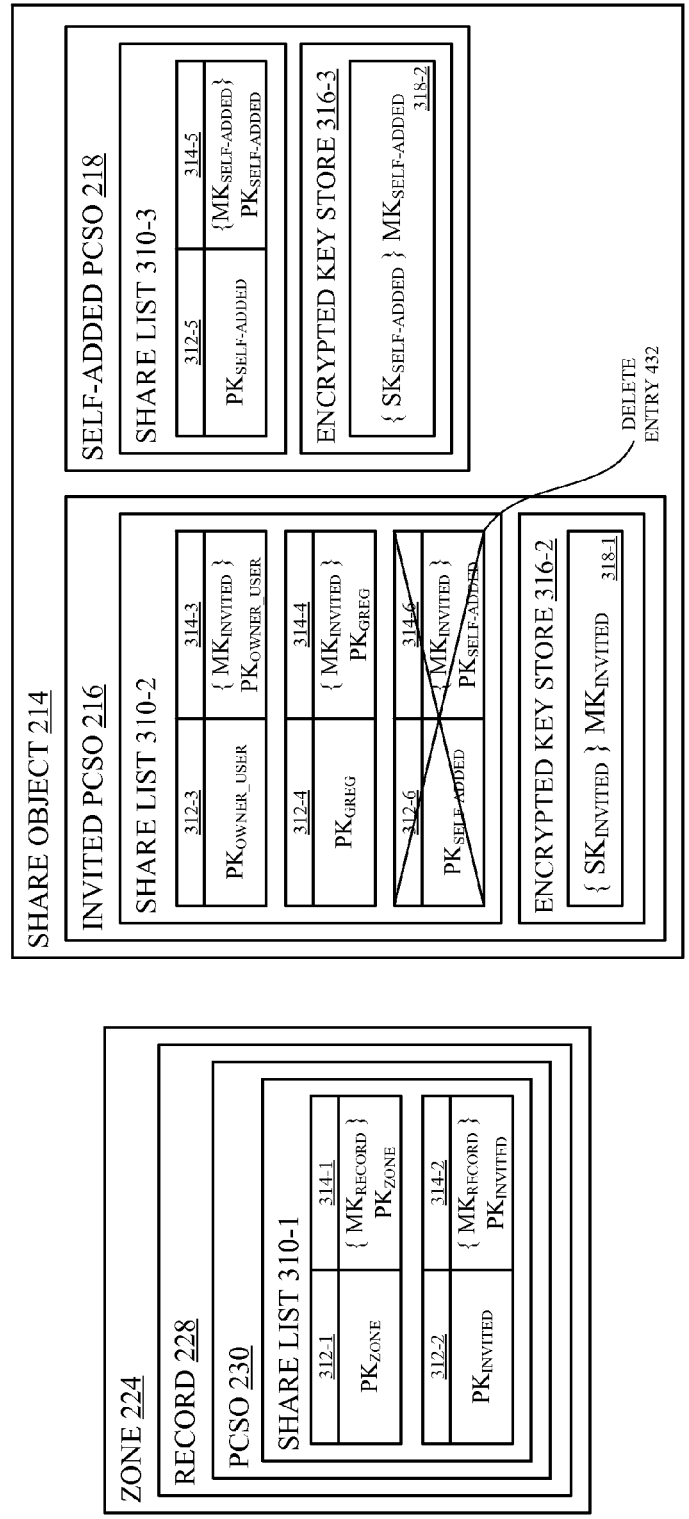
Figure 4E:
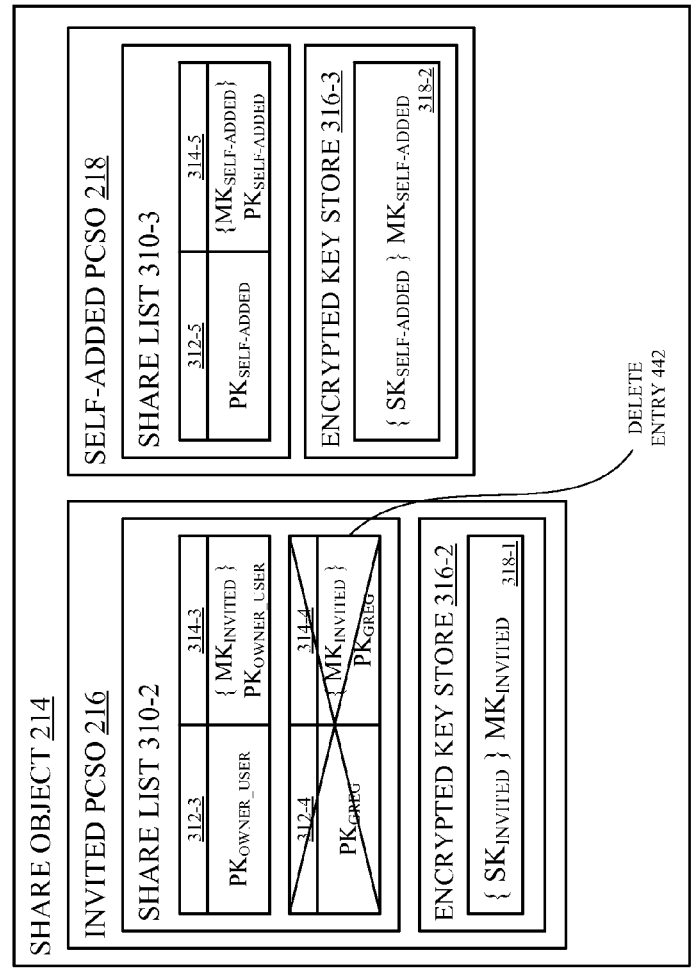

FIG. 4C illustrates a block diagram 420 that represents a third step of the example sequence, where the sharing client 203 receives a request from OWNER_USER to make the record wrapping object 228 publicly-accessible via a public URL that includes the PSK 229. In response to the request, the sharing client 203 creates a read-only mapping entry (as indicated by read-only 422) within the share list 310-2 of the invited PCSO 216. Specifically, the entries 312-6 and 314-6 enable a public user to obtain $MK_{Invited}$ in an unencrypted form, which in turn can be used to unlock the record wrapping object 228. It is noted that removing the public access to the record wrapping object 228 involves removing the entries 312-6 and 314-6 from the share list 310-2 of the invited PCSO 216. This is illustrated in the block diagram 430 of FIG. 4D, which represents a fourth step of the example sequence, and involves the delete entry event 432. Moreover, it is noted that removing GREG's private access to the record wrapping object 228 involves removing the entries 312-4 and 314-4 from the share list 310-2 of the invited PCSO 216. This is illustrated in the block diagram 440 of FIG. 4E, which represents a fifth step of the example sequence, and involves the delete entry event 442.

Figure 5A:
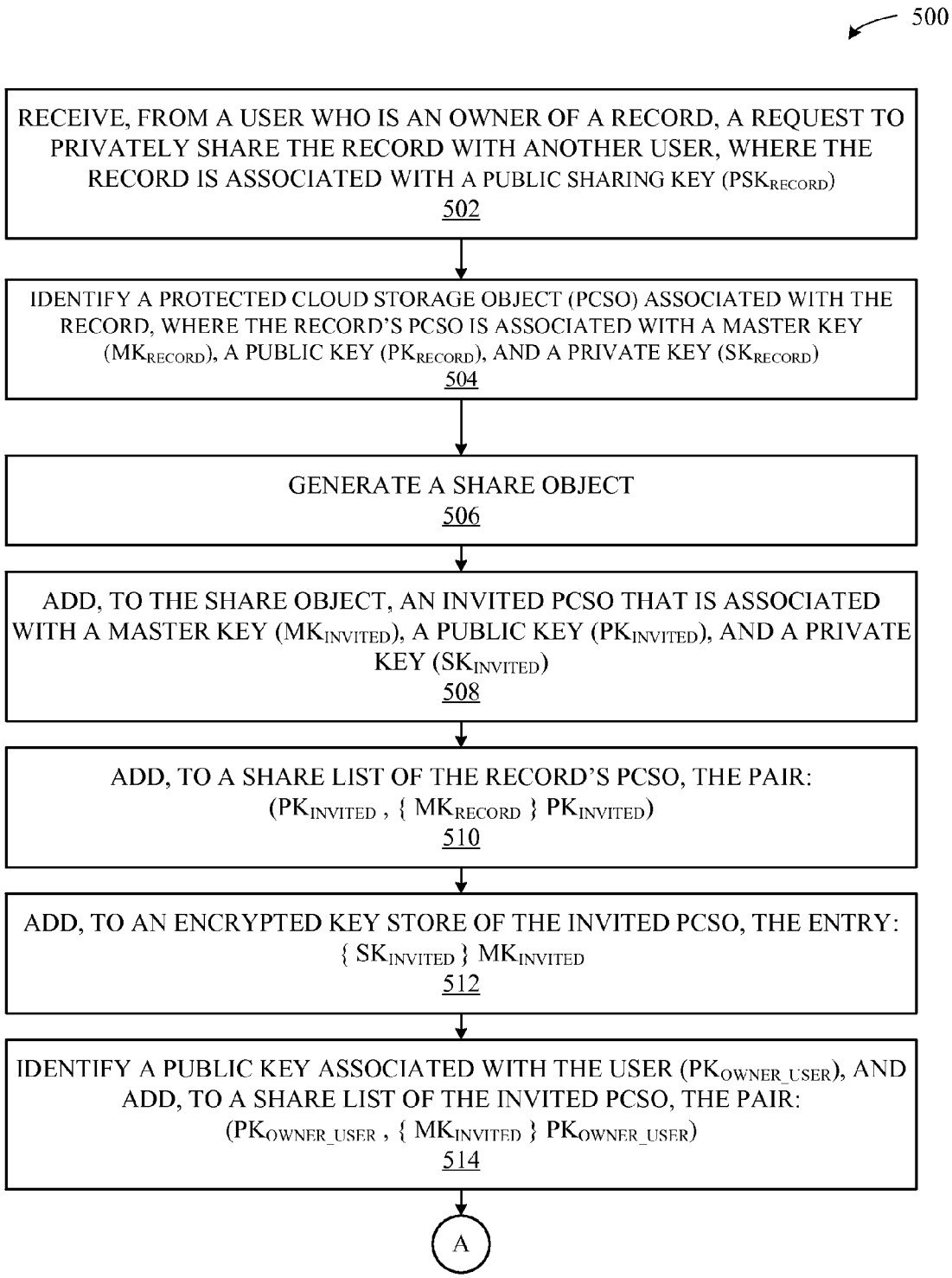
FIGS. 5A-5C illustrate a method for privately and/or publicly sharing an asset, according to one embodiment.
Figure 5B:
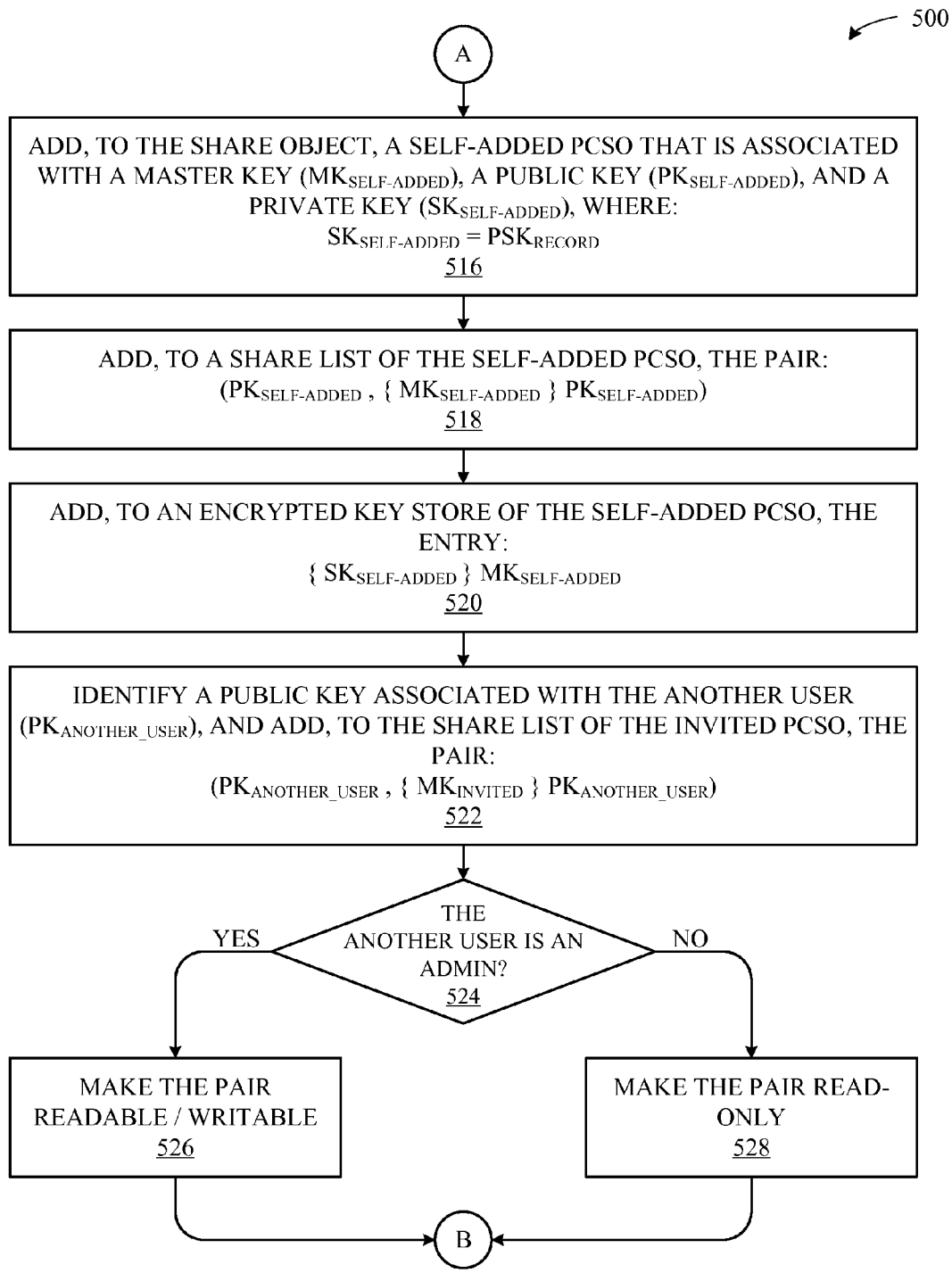
Figure 5C:
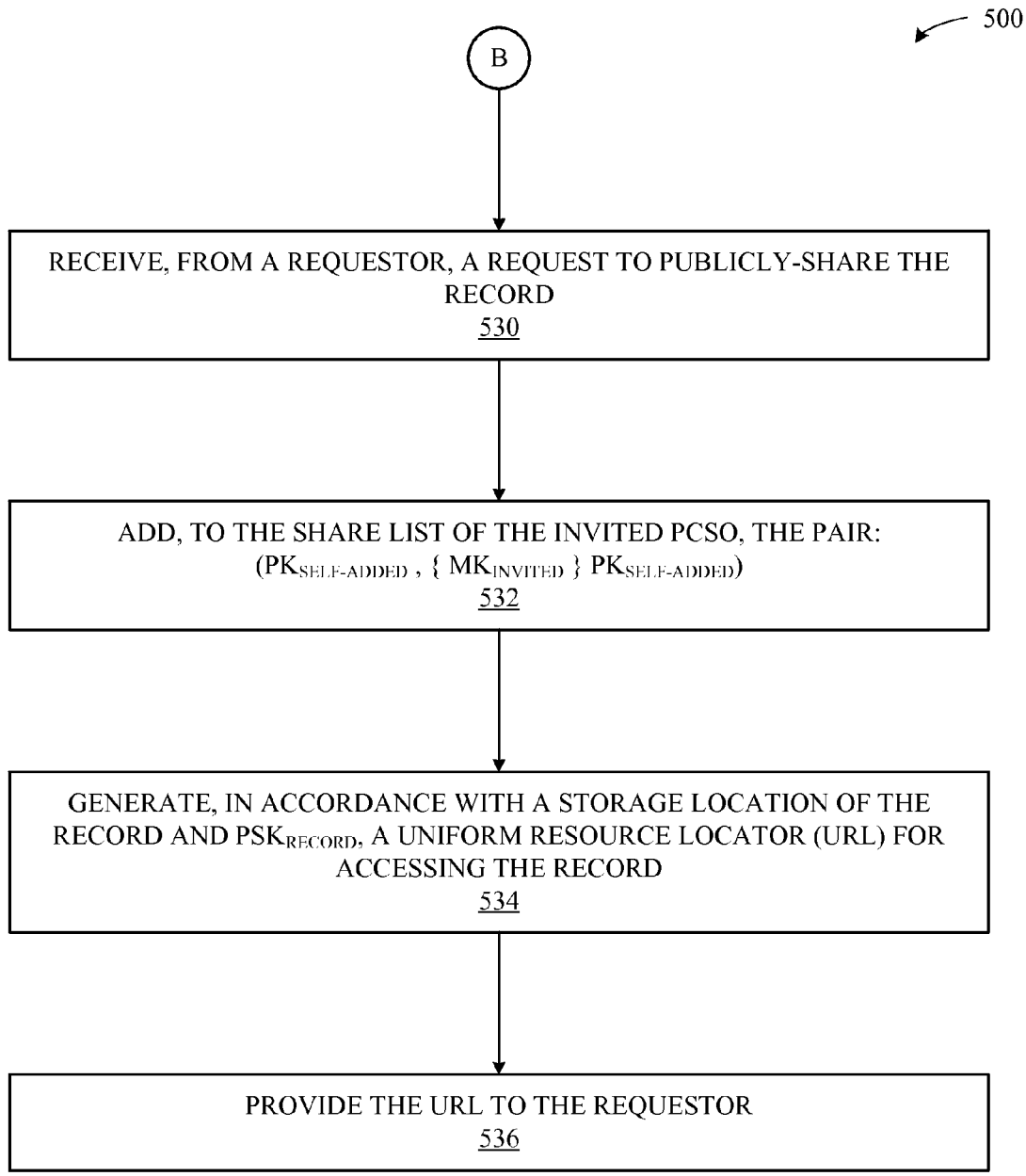

FIGS. 5A-5C illustrate a method 500 for privately and/or publicly sharing an asset, according to one embodiment. As shown, the method 500 begins at step 502, where the sharing client 203 receives, from a user 204 (e.g. "OWNER_USER") who is an owner of a record wrapping object 228, a request to privately share the record wrapping object 228 with another user 204 (e.g. "ANOTHER_USER"), where the record wrapping object 228 is associated with a public sharing key ($PSK_{Record}$) 229. At step 504, the sharing client 203 identifies a PCSO (e.g. PCSO 230) that is associated with the record wrapping object 228, where the PCSO 230 is associated with a master key ($MK_{Record}$), a public key ($PK_{Record}$), and a private key ($SK_{PCSO}$).

At step 506, the sharing client 203 generates a share object 214. At step 508, the sharing client 203 adds, to the share object 214, an invited PCSO (e.g. invited PCSO 216) that is associated with a master key ($MK_{Invited}$), a public key ($PK_{Invited}$), and a private key ($SK_{Invited}$). At step 510, the sharing client 203 adds, to a share list of the PCSO 230, the pair: ($PK_{Invited}$, $\{MK_{Record}\}PK_{Invited}$). At step 512, the sharing client 203 adds, to an encrypted key store of the invited PCSO 216, the entry: $\{SK_{Invited}\}MK_{Invited}$. At step 514, the sharing client 203 identifies a public key associated with the user 204 ($PK_{Owner\_User}$), and adds, to a share list of the invited PCSO 216, the pair: ($PK_{Owner\_User}$, $\{MK_{Invited}\}PK_{Owner\_User}$).

At step 516, the sharing client 203 adds, to the share object 214, a self-added PCSO (e.g. self-added PCSO 218) that is associated with a master key ($MK_{Self-Added}$), a public key ($PK_{Self-Added}$), and a private key ($SK_{Self-Added}$), where: $SK_{Self-Added}$ is equivalent to the $PSK_{Record}$ 229 associated with the record wrapping object 228. At step 518, the sharing client 203 adds, to a share list of the self-added PCSO 218, the pair: ($PK_{Self-Added}$, $\{MK_{Self-Added}\}PK_{Self-Added}$). At step 520, the sharing client 203 adds, to an encrypted key store of the self-added PCSO 218, the entry: $\{SK_{Self-Added}\}MK_{self-Added}$. At step 522, the sharing client 203 identifies a public key associated with the another user 204 ($PK_{Another\_User}$), and adds, to the share list of the invited PCSO, the pair: ($PK_{Another\_User}$, $\{MK_{Invited}\}PK_{Another\_User}$). At step 524, the sharing client 203 determines whether the another user 204 is an admin. If, at step 524, the sharing client 203 determines that the another user 204 is an admin, then the method 500 proceeds to step 526, where the sharing client 203 makes the pair (associated with step 522) readable/writable. Otherwise, the method 500 proceeds to step 528, where the sharing client 203 makes the pair (associated with step 522) read-only.

At step 530, the sharing client 203 receives, from a requestor (e.g., OWNER_USER, or ANOTHER_USER when ANOTHER_USER is an admin), a request to publicly-share the record. At step 532, the sharing client 203 adds, to the share list of the invited PCSO 216, the pair: ($PK_{Self-Added}$, $\{MK_{Invited}\}PK_{Self-Added}$). At step 534, the sharing client 203—in conjunction with the sharing manager 202—generate, in accordance with a storage location of the record and the $PSK_{Record}$ 229 associated with the record wrapping object 228, a Uniform Resource Locator (URL) for accessing the record. Details for generating the URL are set forth below in conjunction with FIG. 6. Finally, at step 536, the sharing client 203 provides the URL to the requestor.

Figure 6:
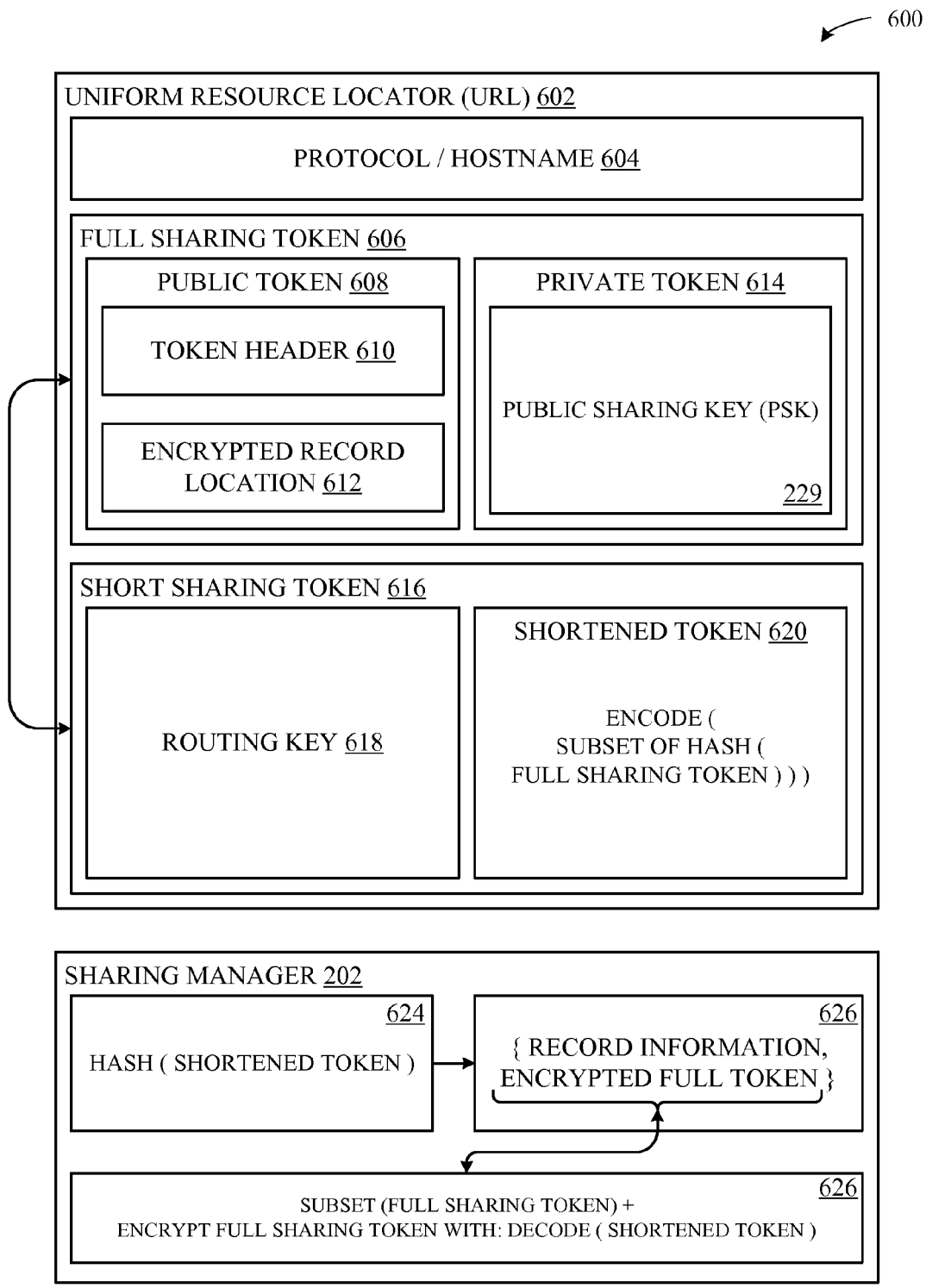
FIG. 6 illustrates a block diagram of a detailed view of a particular manner in which uniform resource locator (URL) is constructed, according to one embodiment.

FIG. 6 illustrates a block diagram of a detailed view of a particular manner in which uniform resource locator (URL) is constructed, according to one embodiment. As shown in FIG. 6, URL 602 can be comprised of various components, including a protocol/hostname 604. The protocol/hostname 604 is primarily used to set forth a domain name with which the sharing manager 202 is associated, e.g., "https://www-.domain.com/cloudstorage". As also shown in FIG. 6, the URL 602 can include a full sharing token 606, or a short sharing token 616 that represents a shortened version of the full sharing token 606 (but provides the same functionality as the full sharing token 606). As described in greater detail below, the URL 602—when configured to include the full sharing token 606 or the short sharing token 616—can enable a user to successfully access a particular record wrapping object 228 within the storage 110 (via the sharing manager 202/sharing client 203).

As shown in FIG. 6, the full sharing token 606 is comprised of a public token 608 and a private token 614. The public token 608 includes a token header 610 and an encrypted record location 612, and serves to indicate the location of the record wrapping object 228 within the storage 110. Specifically, the token header 610 includes information that identifies (i) a particular format/scheme for the token header 610, and (ii) a size of the encrypted record location 612, where the encrypted record location 612 follows the token header 610 within the URL 602. In one embodiment, the encryption of the record location 612 is carried out using a key that is known to the sharing manager 202 ($K_{SharingManager}$). This helps obfuscate the particular manner in which the record wrapping object 228 is stored within the storage 110 (e.g., a file path), as this often considered to be sensitive information that should not be exposed to the users 204. The private token 614 includes a PSK 229 associated with the record wrapping object 228 that corresponds to the encrypted record location 612. Accordingly, when the sharing manager 202 receives the URL 602 (e.g., when a user 204 presents the URL 602 to the sharing manager 202 through his or her computing device 104), the sharing manager 202 can (i) isolate the encrypted record location 612 within the URL 602 (using the token header 610), (ii) decrypt the encrypted record location 612 using $K_{SharingManager}$, and (iii) isolate the PSK 229 within the URL 602 (using the token header 610), and (iv) locate and unlock the record wrapping object 228 (using the record location and the PSK 229) in accordance with the various techniques described above in conjunction with FIGS. 2, 3, 4A-4E, and 5A-5C.

As set forth above, and the URL 602 can be configured to include a short sharing token 616 instead of a full sharing token 606, as the short sharing token 616 can provide a compacted URL 602 that is more user friendly and portable. As shown in FIG. 6, the short sharing token 616 is configured to include a routing key 618 that functions as an opaque, fixed-length prefix that is generated by the sharing manager 202 and is associated with the share object 214 that is created in conjunction with sharing the record wrapping object 228. The short sharing token 616 also includes a shortened token 620, which is generated by carrying out specific functions on the full sharing token 606. Specifically, the shortened token 620 is generated by performing a hash function (e.g., Sha-256) on the full sharing token 606 to produce a hash value, isolating a subset of the hash value (e.g., the first sixteen bytes of the hash value), and encoding the hash value (e.g., using Base64 encoding).

The sharing manager 202 is configured to maintain a mapping entry between the full sharing token 606 and the short sharing token 616, such that the sharing manager 202 can perform the appropriate lookup when a user 204 presents a URL 602 that utilizes the short sharing token 616. Notably, because the full sharing token 606 specifies both the location of the record wrapping object 228 and the PSK 229—which can be used to unlock the record—it is undesirable to configure the sharing manager 202 to store within the storage 110 the full sharing token 606 in a plaintext format, as this would enable anyone with access to the storage 110 to locate and decrypt all documents that have been publicly shared. More specifically, despite the fact that these documents have been publicly shared, they ultimately remain somewhat private as they should only be available to those who have been directly exposed to the URL.

In view of the foregoing, it can be desirable to prevent the full sharing token 606 to be stored locally—at least in plaintext form—by the sharing manager 202 when implementing the mapping between the full sharing token 606 and the short sharing token 616. To achieve this goal, the sharing manager 202 is configured to create a mapping entry that includes element 624 and element 626 (as shown in FIG. 6). Specifically, the element 624 is a value that is based on a hash (e.g., Sha-256) of the shortened token 620, and the element 626 is a value that is based on the following: a subset of the full sharing token 606+{full sharing token 606}Decode(shortened token 620), where the subset of the full sharing token 606 matches the size of the subset function described above in conjunction with the shortened token 620, and (ii) the decoding function matches the encoding function described above in conjunction with the shortened token 620. In this manner, when the sharing manager 202 receives a URL 602 that includes the short sharing token 616, the sharing manager 202 can perform a mapping lookup using the routing key 618 and a value that is based on a hash (e.g., Sha-256) of the shortened token 620, and thereby obtain the full sharing token 606 in an encrypted form. In turn, the sharing manager 202 can decrypt the full sharing token 606 using the shortened token 620, which is directly available through the URL 602 when the short sharing token 616 is utilized. Finally, the decrypted full sharing token 606 can provide the sharing client 203 with the appropriate information to locate and unlock the record wrapping object 228 to which the provided URL 602 corresponds.

Figure 7:
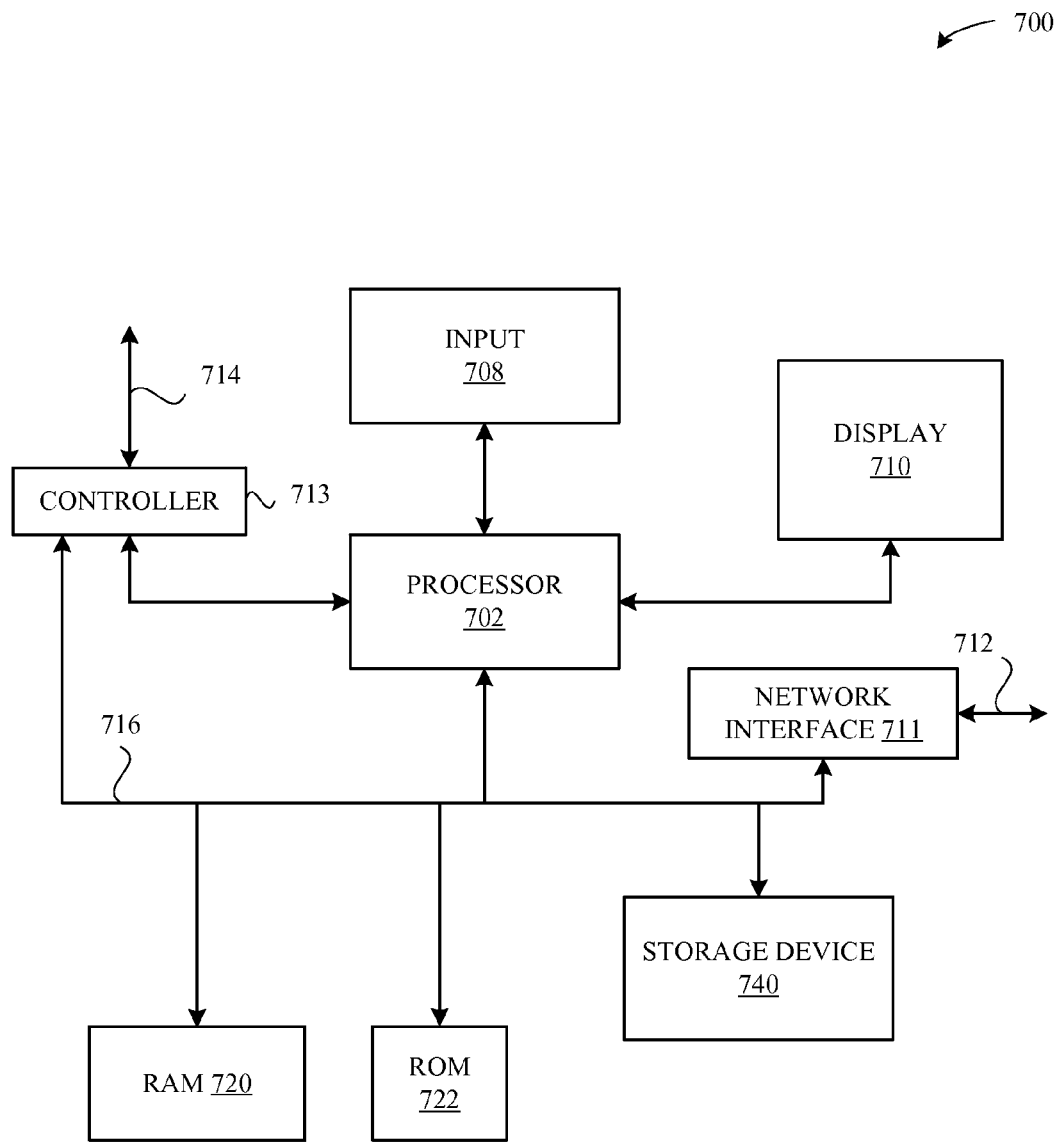
FIG. 7 illustrates a detailed view of a computing device that can be used to implement the various components described herein, according to some embodiments.

FIG. 7 illustrates a detailed view of a computing device 700 that can be used to implement the various components described herein, according to some embodiments. In particular, the detailed view illustrates various components that can be included in the servers 108 or the computing devices 104 illustrated in FIG. 1. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user. A data bus 716 can facilitate data transfer between at least a storage device 740, the processor 702, and a controller 713. The controller 713 can be used to interface with and control different equipment through and equipment control bus 714. The computing device 700 can also include a network/bus interface 711 that couples to a data link 712. In the case of a wireless connection, the network/bus interface 711 can include a wireless transceiver.

The computing device 700 also include a storage device 740, which can comprise a single disk or a plurality of disks (e.g., hard drives), and includes a storage management module that manages one or more partitions within the storage device 740 or within the storage 110. In some embodiments, the storage device 740/storage 110 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling a user to securely share an electronic asset, the method comprising:

at a server computing device:

receiving, from the user, a first request to privately share the electronic asset with a guest, wherein the guest is associated with a guest public key and a guest private key; and in response to the first request:

creating a share object that includes a first protected cloud storage object (PCSO), wherein the first PCSO is associated with an invited master key, an invited public key, and an invited private key, adding, to a first encrypted key store associated with the first PCSO, a first value that is produced by encrypting the invited private key using the invited master key, adding, to a first share list associated with the first PCSO, a first tuple that associates the guest public key with a second value that is produced by encrypting the invited master key using the guest public key, identifying a second PCSO that corresponds to the electronic asset, wherein the second PCSO is associated with an asset master key, an asset public key, and an asset private key, and adding, to a second share list included in the second PCSO, a second tuple that associates the invited public key with a third value that is produced by encrypting the asset master key using the invited public key, wherein, when the guest provides the guest private key, the guest is permitted to access the electronic asset.

2. The method of claim 1, wherein the foregoing private keys enable a decryption of any data that is encrypted using their respective counterpart public keys.

3. The method of claim 1, wherein the first tuple comprises a key/value pair, such that:

the guest public key is the key, and the second value is the value.

4. The method of claim 1, wherein the second tuple represents a key/value pair, such that:
the invited public key is the key, and
the third value is the value.

5. The method of claim 1, further comprising enabling the user to edit the first share list included in the first PCSO.

6. The method of claim 1, wherein, when the user indicates that the guest is not an administrator, the method further includes preventing the guest from editing the first share list included in the first PCSO.

7. The method of claim 1, wherein, when the user indicates that the guest is an administrator, the method further includes enabling the guest to edit the first share list included in the first PCSO.

8. A method for enabling a user to securely share an electronic asset, the method comprising:
at a server computing device:
receiving, from the user, a first request to privately share the electronic asset with a guest, wherein (i) the user is associated with a user public key and a user private key, and (ii) the guest is associated with a guest public key and a guest private key; and
in response to the first request:
creating a share object that includes a first protected cloud storage object (PCSO), wherein the first PCSO is associated with an invited master key, an invited public key, and an invited private key,
encrypting the invited private key using the invited master key to produce a first value, and adding the first value to a first encrypted key store included in the first PCSO,
encrypting the invited master key using the guest public key to produce a second value, and adding, to a first share list included in the first PCSO, a first tuple that associates the guest public key with the second value,
identifying a second PCSO that corresponds to the electronic asset, wherein the second PCSO is associated with an asset master key, an asset public key, and an asset private key, and
encrypting the asset master key using the invited public key to produce a third value, and adding, to a second share list included in the second PCSO, a second tuple that associates the invited public key with the third value, wherein, when the guest provides the guest private key, the guest is permitted to access the electronic asset.

9. The method of claim 8, further comprising:
receiving, from the guest, a second request to access the electronic asset, wherein the second request includes the guest private key; and
in response to the second request:
decrypting, in accordance with the first share list, the second value using the guest private key to obtain the invited master key,
decrypting, in accordance with the first encrypted key store, the first value using the invited master key to obtain the invited private key, and
decrypting, in accordance with the second share list, the third value using the invited private key to obtain the asset master key, wherein the asset master key can be used to unlock the electronic asset.

10. The method of claim 8, further comprising enabling the user to editing the first share list included in the first PCSO.

11. The method of claim 8, wherein, when the user indicates that the guest is not an administrator, the method further includes preventing the guest from editing the first share list included in the first PCSO.

12. The method of claim 8, wherein, when the user indicates that the guest is an administrator, the method further includes enabling the guest to edit the first share list included in the first PCSO.

13. The method of claim 8, further comprising:
receiving, from the user, a second request to publicly share the electronic asset; and
in response to the second request:
creating, within the share object, a third PCSO, wherein:
the third PCSO is associated with a self-added master key, a self-added public key, and a self-added private key,
the electronic asset is associated with a public sharing key (PSK), and the self-added private key is equal to the PSK,
encrypting the self-added private key using the self-added master key to produce a fourth value, and adding the fourth value to a second encrypted key store included in the third PCSO,
encrypting the self-added master key using the self-added public key to produce a fifth value, and adding, to a third share list included in the third PCSO, a third tuple that associates the self-added public key with the fifth value, and
encrypting the invited master key using the self-added public key to produce a sixth value, and adding, to the first share list included in the first PCSO, a fourth tuple that associates the self-added public key with the sixth value, wherein, when a public user provides the self-added private key, the public user is permitted to access the electronic asset.

14. The method of claim 13, further comprising:
receiving, from the public user, a third request to access the electronic asset, wherein the third request includes the self-added private key; and
in response to the third request:
decrypting, in accordance with the first share list, the sixth value using the self-added private key to obtain, the invited master key,
decrypting, in accordance with the first encrypted key store, the first value using the invited master key to obtain the invited private key, and
decrypting, in accordance with the second share list, the third value using the invited private key to obtain the asset master key, wherein the asset master key can be used to unlock the electronic asset.

15. The method of claim 13, further comprising:
generating a uniform resource locator (URL), wherein information included in the URL can be used to identify:
(i) a storage location of the electronic asset, and
(ii) the guest private key.

16. The method of claim 15, further comprising:
shortening an overall length of the URL in a manner that enables the information included in the URL to remain able to identify:
(i) the storage location of the electronic asset, and
(ii) the guest private key.

17. The method of claim 13, further comprising:
preventing the public user from editing the first share list included in the first PCSO.

18. A non-transitory computer readable storage medium configured to store instructions that, when executed by a processor included in a computing device, cause the computing device to enable a user to securely share an electronic asset, by carrying out steps that include:

receiving, from the user, a first request to privately share the electronic asset with a guest, wherein (i) the user is associated with a user public key and a user private key, and (ii) the guest is associated with a guest public key and a guest private key; and in response to the first request:

creating a share object that includes a first protected cloud storage object (PCSO), wherein the first PCSO is associated with an invited master key, an invited public key, and an invited private key, encrypting the invited private key using the invited master to produce a first value, and adding the first value to a first encrypted key store included in the first PCSO, encrypting the invited master key using the guest public key to produce a second value, and adding, to a first share list included in the first PCSO, a first tuple that associates the guest public key with the second value, identifying a second PCSO that corresponds to the electronic asset, wherein the second PCSO is associated with an asset master key, an asset public key, and an asset private key, and encrypting the asset master key using the invited public key to produce a third value, and adding, to a second share list included in the second PCSO, a second tuple that associates the invited public key with the third value, wherein, when the guest provides the guest private key, the guest is permitted to access the electronic asset.

19. The non-transitory computer readable storage medium of claim 18, further comprising:

receiving, from the guest, a second request to access the electronic asset, wherein the second request includes the guest private key; and in response to the second request:

decrypting, in accordance with the first share list, the second value using the guest private key to obtain the invited master key, decrypting, in accordance with the first encrypted key store, the first value using the invited master key to obtain the invited private key, and decrypting, in accordance with the second share list, the third value using the invited private key to obtain the asset master key, wherein the asset master key can be used to unlock the electronic asset.

20. The non-transitory computer readable storage medium of claim 18, further comprising:

receiving, from the user, a second request to publicly share the electronic asset; and in response to the second request:

creating, within the share object, a third PCSO, wherein:

the third PCSO is associated with a self-added master key, a self-added public key, and a self-added private key, the electronic asset is associated with a public sharing key (PSK), and the self-added private key is equal to the PSK, encrypting the self-added private key using the self-added master key to produce a fourth value, and adding the fourth value to a second encrypted key store included in the third PCSO, encrypting the self-added master key using the self-added public key to produce a fifth value, and adding, to a third share list included in the third PCSO, a third tuple that associates the self-added public key with the fifth value, and encrypting the invited master key using the self-added public key to produce a sixth value, and adding, to the first share list included in the first PCSO, a fourth tuple that associates the self-added public key with the sixth value, wherein, when a public user provides the self-added private key, the public user is permitted to access the electronic asset.

* * * * *